3,763,273
IMIDO-SUBSTITUTED POLYAMIDE COMPOSITIONS BLENDED WITH POLYVINYL CHLORIDE
Fred F. Holub and Milton L. Evans, Schenectady, N.Y., assignors to General Electric Company
No Drawing. Original application July 1, 1969, Ser. No. 838,315. Divided and this application Apr. 21, 1971, Ser. No. 136,240
Int. Cl. C08g 41/04
U.S. Cl. 260—857 UN       2 Claims

ABSTRACT OF THE DISCLOSURE

Polyamides having at least one chemically combined aliphatically unsaturated imido radical are provided and a method for making such materials. Blends of the imido-substituted polyamides and a variety of aliphatically unsaturated organic monomers, such as styrene, N-phenylmaleimide, bismaleimides or organic polymers, such as polyphenylene oxides, polyvinyl chloride, polystyrene, polysulfone, polycarbonate, epoxy resins, phenolformaldehyde resins, etc., also are provided. The imido-substituted compositions of the present invention can be employed as molding compounds, laminates, varnishes and adhesives.

---

This application is a division of our copending application Ser. No. 838,315, filed July 1, 1969, entitled, Imido-Substituted Polyamide Compositions, now abandoned.

The present invention relates to polyamide compositions comprising polyamide having at least one chemically combined aliphatically unsaturated imido radical, such as a maleimido radical, and methods for making such polyamide compositions.

The polyamide compositions of the present invention comprise polyamide having at least one chemically combined aliphatically unsaturated imido radical of the formula, (1)

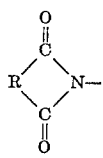

where R is an aliphatically unsaturated divalent organo radical selected from hydrocarbon radicals and halogenated hydrocarbon radicals. Included by R of Formula 1 are radicals of the formula,

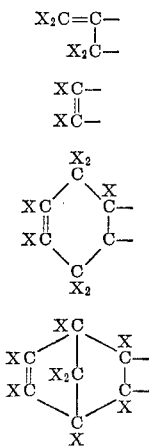

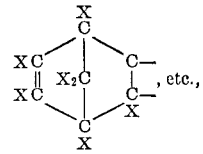

where X is selected from hydrogen, methyl, chloro and mixtures thereof.

The imido-substituted polyamides of the present invention have at least one chemically combined imido radical of Formula 1 which hereinafter will be referred to as an M radical, and consist essentially of chemically combined units of the formula, (2)

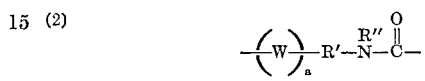

where W is a group selected from, (a) amide units of the formula,

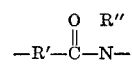

(b) amide acid units of the formula,

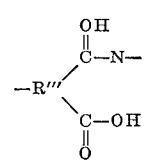

(c) imide units of the formula,

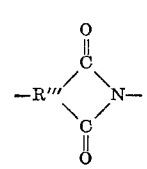

(d) mixtures of (a), (b) and (c), and where R′ is a divalent organo radical selected from hydrocarbon radicals and halogenated radicals, R″ is a monovalent radical selected from hydrogen, monovalent hydrocarbon radicals and halogenated hydrocarbon radicals, R‴ is a trivalent aromatic organo radical selected from hydrocarbon radicals and halogenated hydrocarbon radicals and $a$ is a whole number having a value of 0 or 1.

Radicals included by R′ of Formula 2 are alkylene radicals such as methylene, ethylene, trimethylene, tetramethylene, etc.; arylene radicals such as phenylene, tolylene, xylene, naphthylene, etc.; halogenated divalent hydrocarbons such as fluoroethylene, chlorophenylene, chloronaphthylene, etc. Radicals included by R″ are, for example, aryl radicals such as phenyl, naphthyl, xylyl, etc., and alkyl radicals such as methyl, ethyl, propyl, butyl, hexyl, etc. Radicals included by R‴ are trivalent radicals derived from such aromatic hydrocarbons as benzene, xylene, naphthylene, etc., and include, for example, radicals such as,

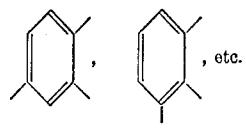

In the above formulas where R′, R″ and R‴ can be more than one radical, these radicals can be all the same, or any two or more of the aforementioned radicals.

Among the polyamides having chemically combined units of Formula 2, there are included,

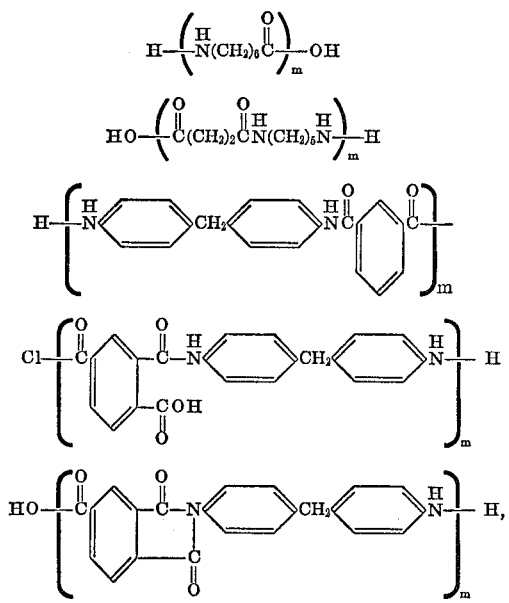

etc.,
where $m$ is an integer having a value of from 1 to 1,000 inclusive, and preferably 5 to 500.

One method of making the imido-substituted polyamides of the present invention is by effecting reaction between a polyamide, as previously defined in Formula 2, and an imido-substituted compound of the formula, (3)

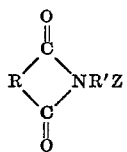

where R, and R' are as previously defined, and Z is a radical selected from

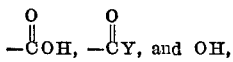

where Y is a halogen radical, such as chloro.

There are included by the imido-substituted compounds of Formula 3,

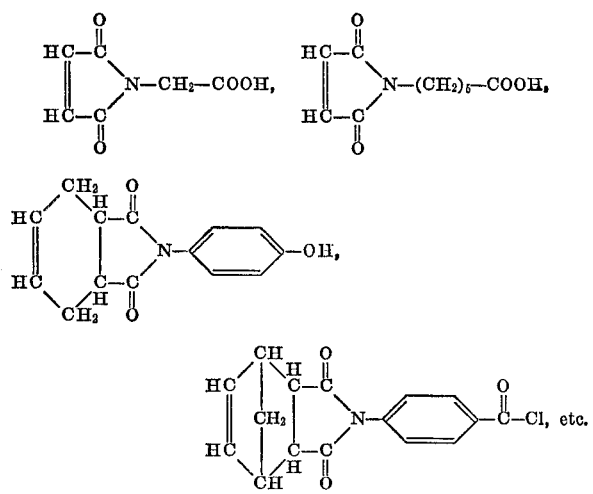

Another method of making the imido-substituted polyamides of the present invention, is by effecting reaction between an aliphatically unsaturated anhydride of the formula, (4)

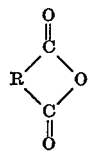

and an amino-terminated polyamide consisting essentially of chemically combined units of Formula 2, where R is as previously defined. Included by the aliphatically unsaturated anhydrides of Formula 4 are, for example, maleic anhydride, citraconic anhydride, tetrahydrophthalic anhydride, etc.

Among the imido-substituted polyamide compositions of the present invention, there are included imido-substituted polyamides derived from the self-condensation of amino-carboxylic acids, or organo-diamines and organo-dicarboxylic acids, etc.; imido-substituted polyamideimides and polyamideimido acids, etc. Some of the imido-substituted polyamides of the present invention are shown by the following formulas, (3)

$$M'-\left(\underset{N}{\overset{R''}{|}} R' \underset{N}{\overset{R''}{|}}\right)_a \left[\overset{O}{\underset{\|}{C}} R' \overset{O}{\underset{\|}{C}} N \underset{R'N}{\overset{R''}{|}} \underset{}{\overset{R''}{|}}\right]_n -M',$$

(4)

$$M-\left(\underset{N}{\overset{R''}{|}}-R'N\underset{}{\overset{R''}{|}}\right)_a \left[\begin{array}{c} O \overset{H}{\underset{|}{C N}} \\ -C R''' \\ C-OH \\ \| \\ O \end{array}\right]_b \left[\begin{array}{c} O \\ \| \\ C \\ -CR'''\ N- \\ C \\ \| \\ O \end{array}\right]_{c,n} \left(R'N\underset{}{\overset{R''}{|}}\right)_a M',$$

(5)

$$M'-\left(\underset{N}{\overset{R''}{|}}-R'N\underset{}{\overset{R''}{|}}\right)_a \left[\left(\overset{O}{\underset{\|}{C}}R'\overset{O}{\underset{\|}{C}}N-R'N\underset{}{\overset{R''}{|}}\right)_d \left\{\begin{array}{c} O \overset{H}{\underset{|}{C N}} \\ -CR''' \\ COH \\ \| \\ O \end{array}\right\}_e \left\{\begin{array}{c} O \\ \| \\ C \\ -CR'''\ N- \\ C \\ \| \\ O \end{array}\right\}_f\right]_n \left(-R'N\underset{}{\overset{R''}{|}}\right)_a M',$$

where R', R'', R''', $m$ and $a$ are as previously defined, M' is selected from imido radicals of Formula 1, and

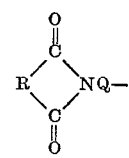

or MQ'' radicals, where R is as previously defined and Q is a divalent organo radical selected from

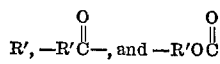

$n$ is an integer equal to 1 to 10, and preferably 5 to 10, $b$ is a whole number equal to 0 to 100, $c$ is a whole number equal to 0 to 100, the sum of $b$ and $c$ can be equal to 1 to 100 and preferably 1 to 50, $d$ is an integer equal to 1 to 100, $e$ is a whole number equal to 0 to 100, $f$ is a whole number equal to 0 to 100, the sum of $e$ and $f$ is equal to 1 to 100, and preferably 5 to 50, and the sum of $d$ and $e$ and $f$ is equal to 2 to 100, and preferably 2 to 50.

Included by the polyamides of Formula 2 are polymers derived from condensation of amino acids and various diacids and diamines. Some of the diamines which can be employed to make the polyamides utilized in the practice of the invention are, for example, ethylenediamine, m-phenylenediamine, p,p'-diaminodiphenylmethane, hexamethylenediamine and piperazine. Some of the diacids or diacidchlorides which can be employed to make the polyamides of the present invention are, for example, oxalic acid, adipic acid, and isophthalic acid, or the acid chlorides of the above. As previously indicated, the polyamides of the present invention can be made by direct amidation of amine groups with carboxyl groups accompanied by an elimination of water. In addition, the polyamides utilized in the present invention also can be made by reaction of acid chlorides such as a condensation of diamines and diacidchlorides. Polymerization based on ring opening such as polymerization of caprolactom, etc.

Among the aromatic polyamides which can be employed in the practice of the present invention are aromatic polyamides derived by the intercondensation of aromatic dicarboxylic acids such as terephthalic acid, isophthalic acid, with diamines such as m-phenylenediamine, 2,4 - diaminotolylene, and bis(4-aminophenyl) methane. In addition, the aforementioned arylenediamines can be reacted with 4-chloroformylphthalic anhydride to provide for the production of a polyamide having chemically combined amide acid and amide units.

The imido-substituted polyamide of the present invention can be used as molding compounds, varnishes, etc., when utilized with an organic solvent such as diamethylformamide N-methylpyrrolidone, etc. The imido-substituted polyamides also can be made into solvent-resistant coating compositions by exposure to high energy electron irradiation by curing with peroxides or other free radical initiators as described below or by heat. The imido-substituted polyamide acids shown by Formula 2 and illustrated by Formulas 4 and 5 also can be electrocoated onto an electrically conducting substrate when the substrate is immersed in the polyamide acid and an electric current is passed through the polyamide acid.

The imido-substituted polyamides of the present invention can be blended with various aliphatically unsaturated organic materials such as aliphatically unsaturated organic monomers and certain organic polymers, as well as organic polymers free of aliphatic unsaturation. Blends of the imido-substituted polyamides and the aforementioned organic monomers or polymers can be made over wide proportions by weight. Experience has shown that there can be employed in the blend at least about 5 percent by weight and preferably from 10 to 40 percent by weight of the imido-substituted polyamide based on the total blend weight to provide for cured products exhibiting such valuable characteristics as solvent resistance, toughness, resistance to deformation at elevated temperatures, etc. Depending upon the proportion of the imido-substituted polyamide in the organic polymer or monomer, the blends can provide for laminates, varnishes, molding compounds, coating compositions, etc.

The aliphatically unsaturated organic monomers which can be employed in combination with the imido-substituted polyamides include, for example, N,N'-p,p'-diphenylmethanebismaleimide, styrene, chlorostyrene, N-phenylmaleimide, diallylphthalate, N,N'-m-phenylenebismaleimide, vinylchloride, isobutylene, butadiene, isoprene, chlorotrifluoroethylene, 2-methylpentyne-1; vinyl esters of organic carboxylic acids such as vinylformate, vinylacetate, acrylonitrile, etc., esters of acrylic and methacrylic acids, etc.; divinylbenzene, triallylcyanurate, triallylisocyanurate, vinylphthalimide, N-allylphthalimide, reaction products of diamines and N,N'-arylene or alkylene bismaleimides, N-allyltetrachlorophthalimide, etc. Among the organic polymers that can be employed in combination with the imido-substituted polyamides of the present invention are, for example, polyvinylchloride, polyphenylene oxides, polypropylene, polysulfones, polyarylsulfone ethers, epoxy resins, phenolformaldehyde resins, organo polysiloxanes, polyesters, polycarbonates, acrylonitrile-butadiene-styrene copolymers, styrene-butadiene block polymers, etc.

The blend of the imido-substituted polyamide and the aforementioned organic monomers or polymers, can be cured with conventional free radical initiators at temperatures of from 50° C. to 250° C., while 100° C. to 200° C. has sometimes been found to be more desirable. Acceleration of the cure can be achieved with organic peroxides, such as dicumyl peroxide, benzoyl peroxide, tertiary butylperbenzoate, tertiary alkylperoxycarbonate, azodicarbonamides, 2,5-dimethyl, -2,5-bis-(tert-butylperoxyhexane), etc. The peroxides can be employed from about 0.1 percent to about 5 percent by weight, based on the total weight of the blend. In addition, the imido-substituted polyamides or blends thereof, in addition to being curable by the aforementioned free radical initiators, can be cured with heat or radiation with high electrons, X-rays, ultraviolet light, etc.

One of the methods of making the imido-substituted polyamide of the present invention involves effecting reaction between the imido-substituted compound, such as shown by Formula 3 and the polyamide consisting essentially of chemically combined units of Formula 2 utilizing an organic solvent at temperatures in the range of between 25° C. to 250° C. and preferably 30° C. to 45° C. Any suitable solvent can be employed to facilitate the formation of the imido-substituted polyamide, which are inert to the reactants under the conditions of the reaction. For example, there can be employed such solvents as N-methylpyrrolidone, dimethylformamide, dimethylacetamide, etc.

The type of imido compound of Formula 3 used to incorporate imido radicals of Formula 1 into the polyamide will generally be influenced by the nature of the terminal groups of polyamide used, which can include, for example, such terminal groups as amino groups, carboxy groups, hydroxy groups, amide acid groups, imide groups, etc. In addition, when employing an imido-substituted acylhalide in combination with the polyamide, an acid acceptor such as pyridine, triethylamine can be utilized to facilitate the formation of the imido-substituted polyamide.

In addition to the aforementioned aliphatically unsaturated monomers and organic polymers which can be employed with the imido-substituted polyamides, there also can be employed by weight proportions of from 0 to 100 parts per 100 parts of the imido-substituted polyamide, fillers such as treated with clay, ground quartz, glass beads, film silica, sand, carbon black, glass fibers, quartz fibers, carbon fibers, asbestos, etc. In addition, other ingredients can be employed such as solvents, etc., at from 60 percent to 90 percent by weight of the resulting curable composition. For example, there can be used N-methylpyrrolidone, dimethylacetamide, and plasticizers such as trioctyltrimellitate chlorinated biphenyl, etc.

In order that those skilled in the art will be better able to practice the present invention, the following examples are given by way of illustration and not by way of limitation. All parts are by weight.

EXAMPLE 1

There was added 5.2 parts of a diamine having the formula,

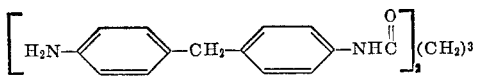

to a mixture of 1.96 parts of maleic anhydride and 30 parts of dimethylformamide in a Dry Ice acetone bath at —20° C. After the addition was complete, the mixture was allowed to warm to room temperature and one part of fused anhydrous sodium acetate and 10 parts of acetic anhydride were added. The mixture was then stirred for about 12 hours. The mixture was then poured into water effecting the precipitation of a solid that was filtered and dried in vacuo at 80° C.

Based on method of preparation and its infrared spectrum, the product was a maleimido-terminated polyamide having the formla,

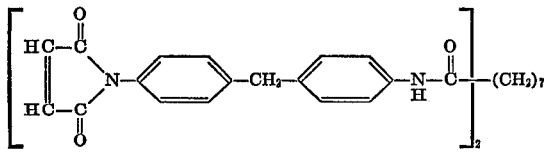

A film of the above maleimido-terminated polyamide was cast from a solution of N-methylpyrrolidone con-

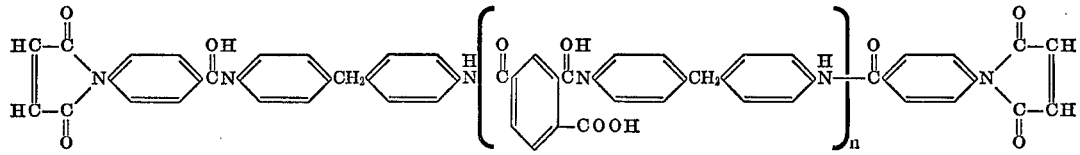

taining 4 percent by weight of dicumyl peroxide based on the weight of the solids. The film was cured at 150° C. for ½ hour and 200° C. for ½ hour. The film did not melt up to 300° C. and was insoluble and resisted swelling in N-methylpyrrolidone. When placed between 2 conducting wires having a diameter of about 50 mil under a 1,000-gram weight, in accordance with the test procedure of Precopio et al., Patent 2,936,296, the film was found to have a cut-through of 330° C. Based on these results, one skilled in the art would know that the solution blend of the maleimido-terminated polyamide and peroxide can provide for valuable solvent resistant films and coatings useful in dietlectric and insulating applications.

EXAMPLE 2

A mixture of 5.2 parts of the diamine of Example 1, 4.71 parts of p-maleimidobenzoylchloride, 40 parts of dimethylformamide and 2 parts of pyridine was stirred under a nitrogen atomsphere. An exothermic reaction occurred when the reactants were combined and stirred. After stirring the mixture for 1 hour, it was poured into water which effected the precipitation of a gray-brown solid. It was filtered and dried in vacuo at 80° for about 12 hours. Based on method of preparation, and its infrared spectrum, the product was a maleimido-terminated polyamide having the formula,

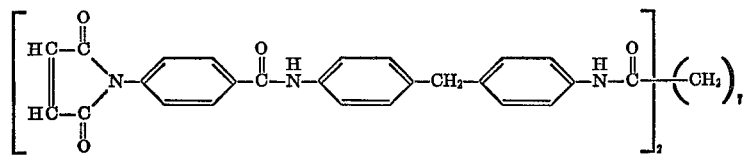

A film of the above maleimido-terminated polyamide was cast from N-methylpyrrolidone in accordance with the procedure of Example 1. The film was cured at 150° C. for ½ hour and 200° C. for ½ hour. The cured film had a melting point greater than 400° C. and was insoluble in N-methylpyrrolidone. The film had valuable solvent resistant properties and can be employed as a high-performance insulating coating material on metallic and nonmetallic substrates.

EXAMPLE 3

There was added to a mixture of 9.9 parts of methylene dianiline and 70 parts of dry dimethylacetamide at a temperautre of 4° C. under a nitrogen atmosphere, 4.71 parts of p-maleimide benzoylchloride and 6.42 parts of 4-chloroformylphthalic anhydride. An immediate exothermic reaction occurred which resulted in an exotherm to 45° C. The resulting mixture was stirred for two hours under nitrogen. The mixture was then poured into methanol to effect the precipitation of the product which was dried in vacuo at 70° C. for about 12 hours. Based on method of preparation and nitrogen analysis, the product was a maleimido-terminated polyamide acidamide having the formula,

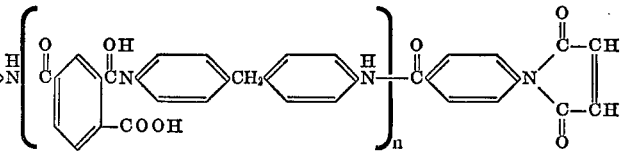

where $n$ has the approximate average value of 4.

A 20 percent solids solution in N-methylpyrrolidone containing about 2 percent by weight of dicumyl peroxide was used to cast a film on an aluminum substrate. The film was cured at 125° C. for one hour and 200° C. for one hour. The film was found to be tough and flexible and had a cut-through of 270° C. employing the tests utilized in Example 1. The film also was found to be insoluble in N-methylpyrrolidone. Based on these properties, one skilled in the art would know that the curable mixture of the above maleimido-terminated polyamide acid would be useful in making a variety of high temperature solvent-resistant coatings.

EXAMPLE 4

There was added to a mixture of 9.9 parts of p,p'-methylene dianiline and 70 parts of dry dimethylacetamide at a temperature of about 4° C. under nitrogen, 4.71 parts of p-maleimidobenzoylchloride and 8.12 parts of isophthaloyl chloride while the mixture was stirred. The temperature of the mixture rose to 70° C. and it was stirred for an additional two hours under nitrogen after the addition was completed.

The mixture was then poured into methanol to effect the precipitation of the product which was filtered and dried in vacuo at 70° C. for about 12 hours. Based on method of preparation and nitrogen analysis, the product was a maleimido-terminated polyamide having the formula,

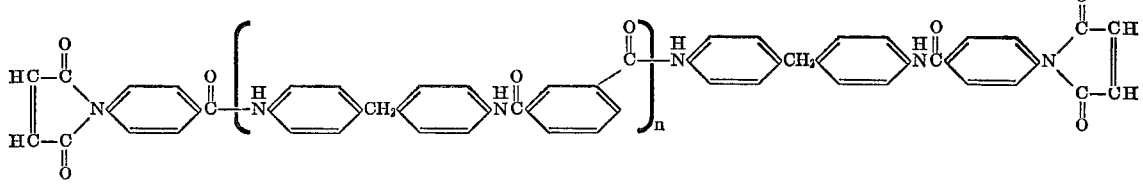

where $n$ has the approximate average value of 4.

In accordance with the above-described procedure, a film was cast from a 20 percent N-methylpyrrolidone solution of the above maleimide-terminated polyamide containing 2 percent by weight of dicumyl peroxide. The film was cured at 125° C. for one hour and 200° C. for one hour. It had a cut-through of 345° C. based on the tests described in Example 1 and it was insoluble in N-methylpyrrolidone. Based on the properties, one skilled in the art would know that the polyamide having terminal maleimido radicals could provide for the production of high temperature laminating compounds.

EXAMPLE 5

There was added to a mixture of 9.9 parts of p,p'-methylene dianiline, 70 parts of dry dimethylacetamide maintained at a temperature of 4° C. under a nitrogen atmosphere, 4.71 parts of p-maleimidobenzoyl chloride, 4.06 parts of isophthaloyl chloride and 3.21 parts of 4-chloroformylphthalic anhydride. Upon the addition of the aforementioned ingredients, the mixture exothermed to a temperature of 50° C. The mixture was then stirred for an additional 2 hours under nitrogen after the addition was completed. The mixture was then poured into methanol to effect the precipitation of the product. The product was dried in vacuo at 70° C. for a period of 12 hours. Based on method of preparation and nitrogen analysis, the product was a maleimido-terminated polyamide acid-amide consisting of chemically combined units of the formulas,

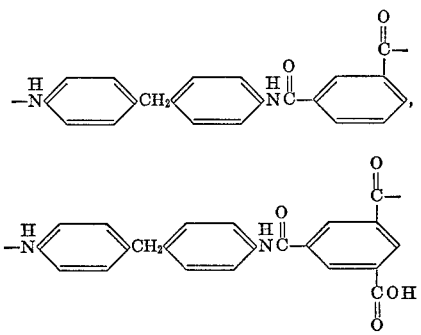

A 20 percent solution of the above maleimido-terminated polyamide acid-amide containing 2 percent by weight of dicumyl peroxide in N-methylpyrrolidone was used to cast a film on aluminum substrate. The film was cured at a temperature of 125° C. for 1 hour and 200° C. for 1 hour. After the cure, a tough, flexible film was produced having a cut-through of 280° C. which was insoluble in N-methylpyrrolidone. Based on the aforementioned properties, those skilled in the art would know that the maleimido-terminated polyamide acid-amide would be useful as a wire enamel and an electrical insulator on copper wire.

EXAMPLE 6

A blend of 33 parts of the maleimido-terminated polyamide of Example 1, 65 parts of methylene dianilinebismaleimide and 2 parts of dicumyl peroxide was made in the form of a solution in N-methylpyrrolidone containing about 20 percent solids by weight. A film was cast from the blend on an aluminum substrate. The film was cured for 1 hour at 125° C. and 1 hour at 200° C. A valuable self-supporting solvent resistant insulating film was obtained having a cut-through of 375° C.

EXAMPLE 7

A film was cast on an aluminum substrate from an N-methylpyrrolidone solution of a 20 percent solids by weight blend of 33 parts of the maleimido-terminated polyamide acid of Example 1, 65 parts of a poly(2,6-dimethylphenylene oxide) having an intrinsic viscosity in chloroform at 25° of 0.49 and 2 parts of dicumyl peroxide. The film was cured for 1 hour at 125° C. and 1 hour at 200° C. The film was found to be a tough, self-supporting material having a cut-through of about 183° C. as compared to 142° C. for the cured poly(phenylene oxide) free of the M-terminated polyamide.

EXAMPLE 8

In accordance with the procedure of Example 7, a film was cast on aluminum substrate from a 20 percent solids N-methylpyrrolidone solution of a blend of 33 parts of the maleimide-terminated polyamide of Example 1, 65 parts of polyvinylchloride (Geon-101) and 2 parts of dicumyl peroxide. The film was cured for 1 hour at 125° C., and 1 hour at 200° C. A tough film was obtained which was insoluble in N-methylpyrrolidone. It had a cut-through of 285° C. Based on these results, the curable blend was valuable as a compound useful for making a solvent resistant coating.

A further method of making the imido-substituted polyamides of the present invention is by employing an imido-alkylene compound such as a hydroxide or chloride in the presence of a Friedel-Crafts catalyst such as boron trifluoride, in accordance with the method of Klebe and Windish Ser. No. 838,322, filed July 1, 1969, now abandoned filed concurrently herewith and assigned to the same assignee as the present invention. Although the preceding examples are limited to only a few of the many imido-substituted polyamides included by the present invention, it should be understood that the present invention is directed to a much broader class of imido-substituted polyamides, where the N atom of such imido radicals either can be directly joined to the polyamide in the terminal position or along the polymer backbone, or be joined to the polymer in either of such positions by divalent connecting organo radicals having 2 or more carbon atoms, including alkylene radicals such as $-(CR'_2)_x-$, where x is an integer having a value of from 2 to 4 inclusive, divalent aromatic carbocyclic radicals having from 6 to 18 carbon atoms, where such alkylene radicals or divalent aromatic carbocyclic radicals can be joined directly to the polymer by a carbon-carbon bond, or by an ester, amide, or ether linkage.

What is claimed is:

1. A blend in accordance with claim 2, where the aromatic carbocyclic polycarbonamide has the formula,

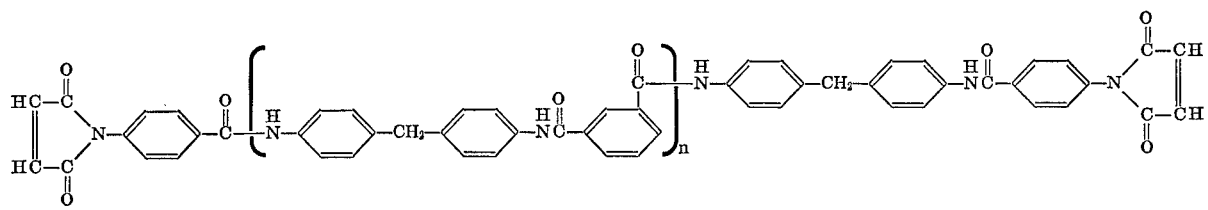

and the organic polymer is polyvinyl chloride.

2. A film-forming blend consisting essentially by weight of from up to about 95% of polyvinyl chloride and at least about 5% of an aromatic carbocyclic polycarbonamide having attached in the terminal position by carbon-carbon linkage, imido radicals of the formula

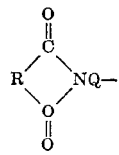

where R is an aliphatically unsaturated divalent organo radical selected from the class consisting of hydrocarbon radicals and halogenated hydrocarbon radicals, and Q is a divalent radical selected from the class consisting of

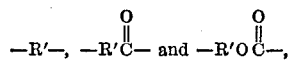

where R' is a divalent radical selected from the class consisting of hydrocarbon radicals and halogenated hydrocarbon radicals.

References Cited
UNITED STATES PATENTS 2,818,405   12/1957   Kovacic ......... 260—78 UA
3,652,710   3/1972    Holub et al. ...... 260—78 UA HAROLD D. ANDERSON, Primary Examiner U.S. Cl. X.R.

117—161 P; 204—14 N, 159.14, 159.22; 260—30.2, 32.6 N, 31.8 M, 33.8 UA, 37 N, 41 R, 78 TF, 841, 857 PA